(12) United States Patent
Yamaguchi (10) Patent No.: US 6,952,422 B2
(45) Date of Patent: Oct. 4, 2005

(54) CONGESTION CONTROL METHOD AND SYSTEM

(75) Inventor: Kazuyuki Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 802 days.

(21) Appl. No.: 09/850,107

(22) Filed: May 8, 2001

(65) Prior Publication Data

US 2001/0038609 A1 Nov. 8, 2001

(30) Foreign Application Priority Data

May 8, 2000 (JP) ........................................ 2000-134482

(51) Int. Cl.$^7$ ............................................. H04L 12/56
(52) U.S. Cl. ....................... 370/401; 370/229; 370/338; 709/226; 715/853
(58) Field of Search ................................. 709/226, 228; 715/853; 370/401, 229–235, 338, 352, 236, 315, 465; 345/853, 841, 864, 748, 825

(56) References Cited

U.S. PATENT DOCUMENTS 6,147,687 A  *  11/2000  Wanderski ................... 345/853
6,640,248 B1 *  10/2003  Jorgensen .................... 709/226

FOREIGN PATENT DOCUMENTS

| EP | 0 868 063 | 9/1998 |
| EP | 0 932 282 | 7/1999 |
| EP | 0 982 909 | 3/2000 |

OTHER PUBLICATIONS

Bhatti, N. et al.: "Web Server Support for Tiered Services", IEEE Network, vol. 13, No. 5, Sep. 1999, pp. 64–71, XP–000875312.

Bhatti N. et al.: "Web Server Support for Tiered Services", IEEE Network, IEEE Inc. New York, US, vol. 13, No. 5, Sep. 1999, pp. 64–71, XP–000875312.

* cited by examiner

*Primary Examiner*—Phirin Sam
*Assistant Examiner*—Robert W. Wilson
(74) *Attorney, Agent, or Firm*—Young & Thompson (57) ABSTRACT

Association identifiers for identifying, as the flow of a series of services, screen information are imparted to respective screen informations in a tree structure constituting a web service provided by the contents server. The association identifiers are constituted respectively by an identifier "start" representing a start screen of a series of service elements, an identifier "continue" representing a screen located along the way to contemplated information, and an identifier "end" representing a screen of the final contemplated information. When a congested state has occurred in the GW server during operation, the GW server judges the association identifier contained in screen information to be relayed. In this case, for screen information which is in the state of continuation for the series of service elements and, at the same time, the association identifier represents "continue," the relay of the transfer of service information is continued until an association identifier representing "end" appears. On the other hand, for a request for the connection of a new service provided with an association identifier representing "start," the connection is cut off. The above construction can prevent the cut-off of connection during utilization of service and thus can contribute to improved service to users.

15 Claims, 9 Drawing Sheets

| TERMINAL ID | SERVICE SCREEN IDENTIFIER | ASSOCIATION IDENTIFIER | START/CONTINUE/END |
|---|---|---|---|
| (PHONE NO. ETC.) | (URL ETC.) | | |
| | | | |
| | | | |

CONGESTION CONTROL METHOD AND SYSTEM

FIELD OF THE INVENTION

The invention relates to a congestion control system in a network for supplying web (world wide web) services to mobile users.

BACKGROUND OF THE INVENTION

Figure 1:
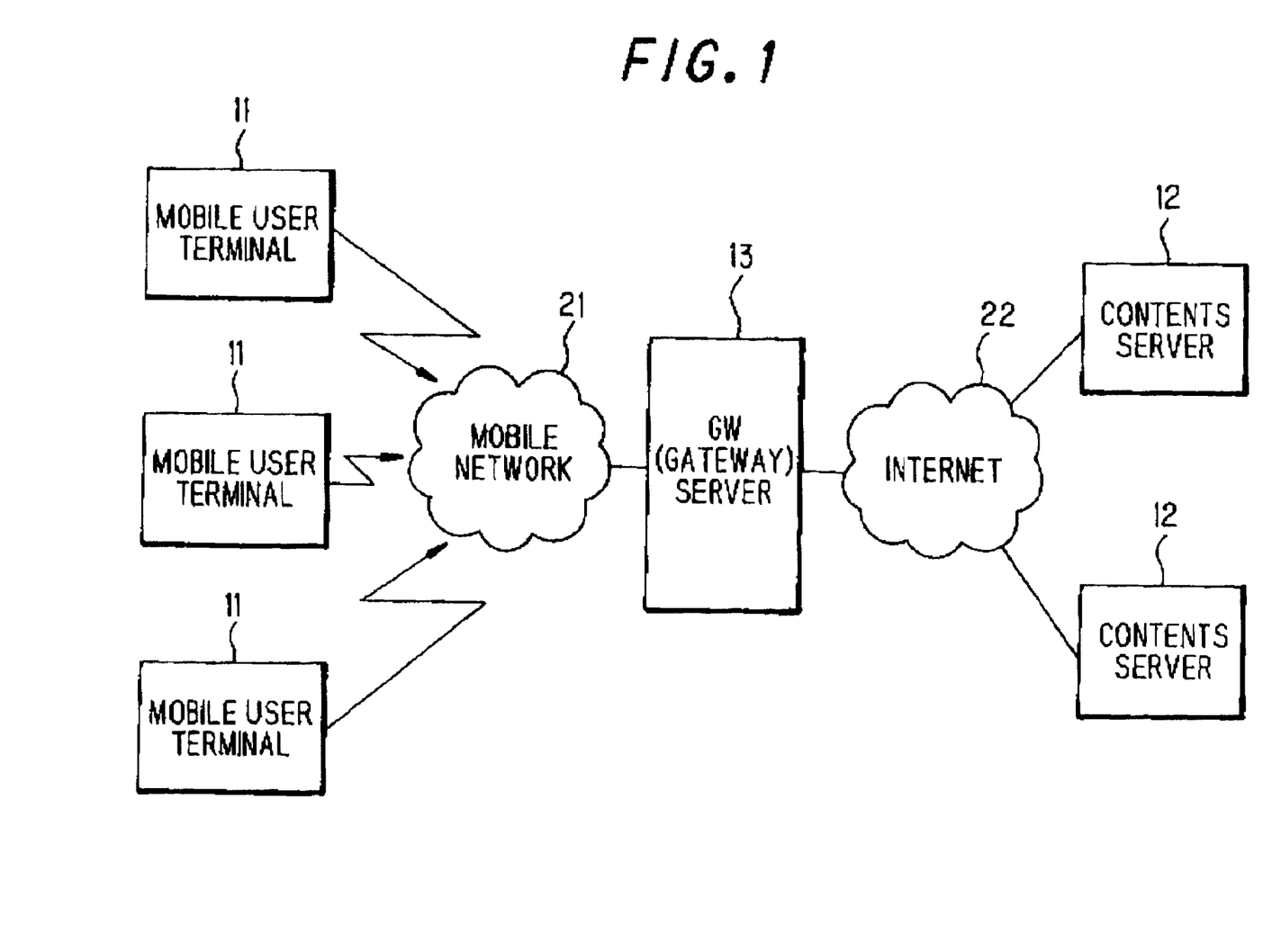
FIG. 1 is a diagram showing the construction of a network for supplying a web service to mobile users, to which the invention is applied.

FIG. 1 shows an example of the construction of a network for supplying web services to mobile users. The network comprises: a mobile user terminal (11) located in a mobile network (21); a contents server (12) for supplying contents service in the Internet (22); and a GW (gateway) server (13) used as a repeater in the case where access is made from the mobile network (21) to the Internet (22).

Figure 2:
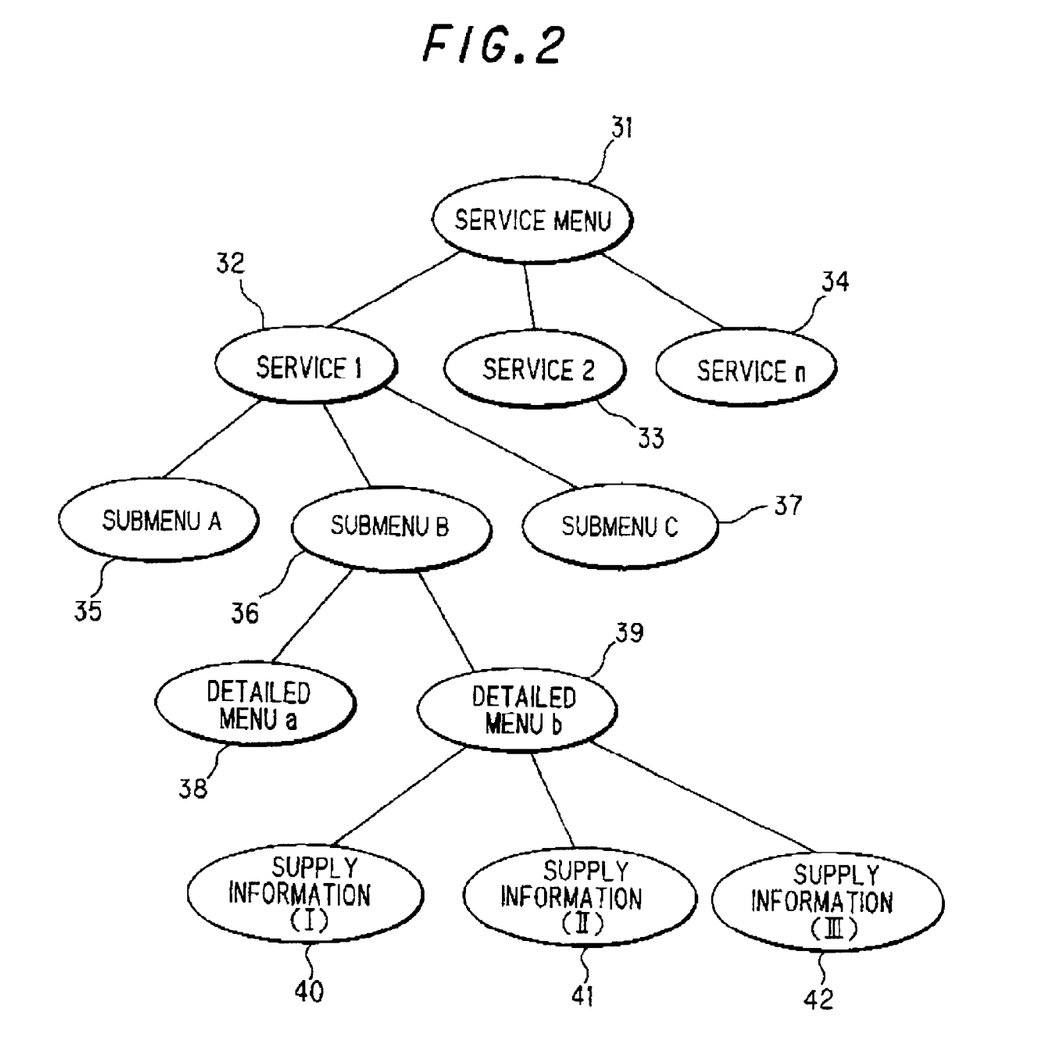
FIG. 2 is a diagram showing a tree structure constituting a web service.

The network is constructed so that, when a user wishes to receive a web service from the contents server (12), as shown in FIG. 2, in order to reach a desired service, the user first selects a screen having a tree structure in a menu form and then successively selects lower-rank screens.

For example, a service menu (31) is a screen for selecting a desired service from a service 1 (32), a service 2 (33), and a service n (34). The service 1 (32) is a screen for selecting a submenu from a submenu A (35), a submenu B (36), and a submenu C (37). Thus, information supplied as a service is successively selected from a group of screens having a tree structure in a menu form.

Figure 9:
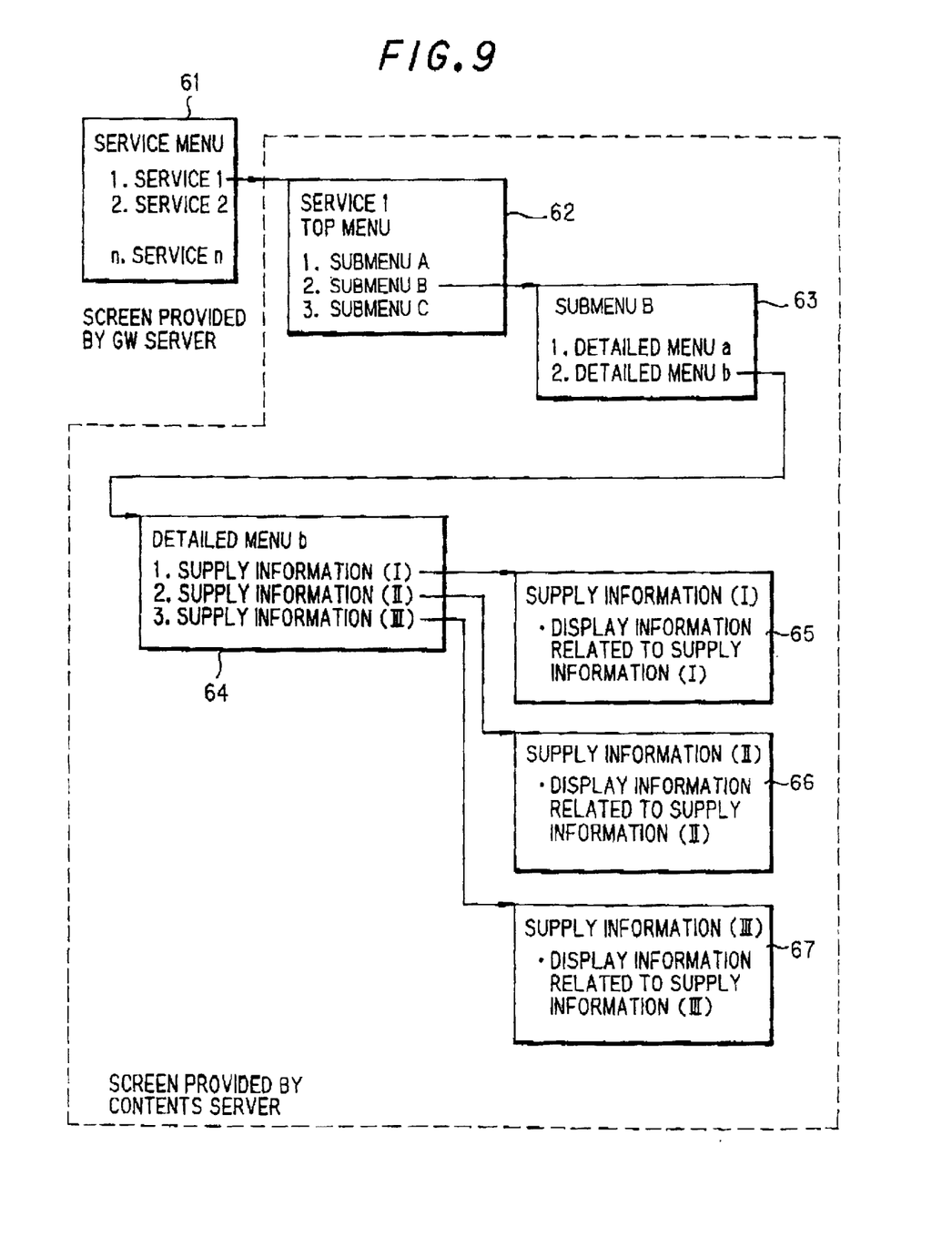
FIG. 9 is a diagram showing a prior art technique.

FIG. 9 shows each screen information constituting the above service in a conventional system. In this system, a desired service is selected from a service menu screen (61) provided by a GW server (13). After that, the user successively selects a desired service from screens provided by a contents server (12) for supplying the selected service, that is, a desired service from a top menu screen (62), a desired service from a submenu screen (63), and a desired service from a detailed menu (64) in that order to display desired supply information.

In FIG. 9, the screen informations constituting the above service (for example, in the case of a service 1 shown in FIG. 9, screen information in a top menu (62), a submenu B (63), a detailed menu b (64), and a supply information I (65)) are transferred as informations independent of one another to the user terminal (11), and these screen informations are not recognized as a series of service elements.

For this reason, for example, upon the occurrence of congestion in the GW server (13), the GW server (13) cannot judge whether the screen provided by the contents service (11) is a request for a new service or a request for screen information along the way to contemplated information during the execution of a series of services. Therefore, the GW server (13) should equally process all the requests for access. This disadvantageously results in a prolonged wait time for the service. Otherwise, the GW server (13) should cut off all the requests for access.

SUMMARY OF THE INVENTION

Accordingly, it is an object of the invention to provide a congestion control method or system wherein means for giving priority to a user in the state of utilization of service upon the occurrence of congestion in the GW server is provided to prevent the cut-off of connection during the utilization of service and thus to improve the quality of services to users.

According to the first feature of the invention, a congestion control method for a network comprises: a mobile user terminal located in a mobile network; a contents server for providing a contents service in the Internet; and a GW (gateway) server used as a repeater in the case where access is made from the mobile network to the Internet, wherein association identifiers for identifying, as the flow of a series of services, screen informations ranging from information in a service top menu to supply information in contemplated service are imparted to respective screen informations in a tree structure constituting a web service provided by the contents server, and upon the occurrence of congestion, priority connection control of the service being in connection is performed based on the association identifiers.

According to the second feature of the invention, a congestion control system for a network comprises: a mobile user terminal located in a mobile network; a contents server for providing a contents service in the Internet; and a GW (gateway) server used as a repeater in the case where access is made from the mobile network to the Internet, wherein association identifiers for performing the priority connection control of a service being in connection upon the occurrence of congestion are imparted respectively to screens of a tree structure constituting a web service provided by the contents server.

According to the congestion control method and system of the invention, the GW server or the contents server can recognize a combination of a series of screens as a single service. The handling of the combination of a series of screens as a single service permits, upon the occurrence of congestion, the GW server or the contents server to perform congestion control such that priority in the provision of service is given to a service being in connection by the user.

BRIEF DESCRIPTION OF THE DRAWINGS

The invention will be explained in more detail in conjunction with the appended drawings, wherein.

DESCRIPTION OF THE PREFERRED EMBODIMENTS

Preferred embodiments of the invention will be explained in conjunction with the accompanying drawings.

FIG. 1 shows the construction of a network to which the invention is applied. The basic construction of this network is the same as the conventional network, and comprises: a mobile user terminal (11) located in a mobile network (21) a contents server (12) for supplying contents service in the Internet (22); and a GW (gateway) server (13) used as a repeater in the case where access is made from the mobile network (21) to the Internet (22).

Figure 3:
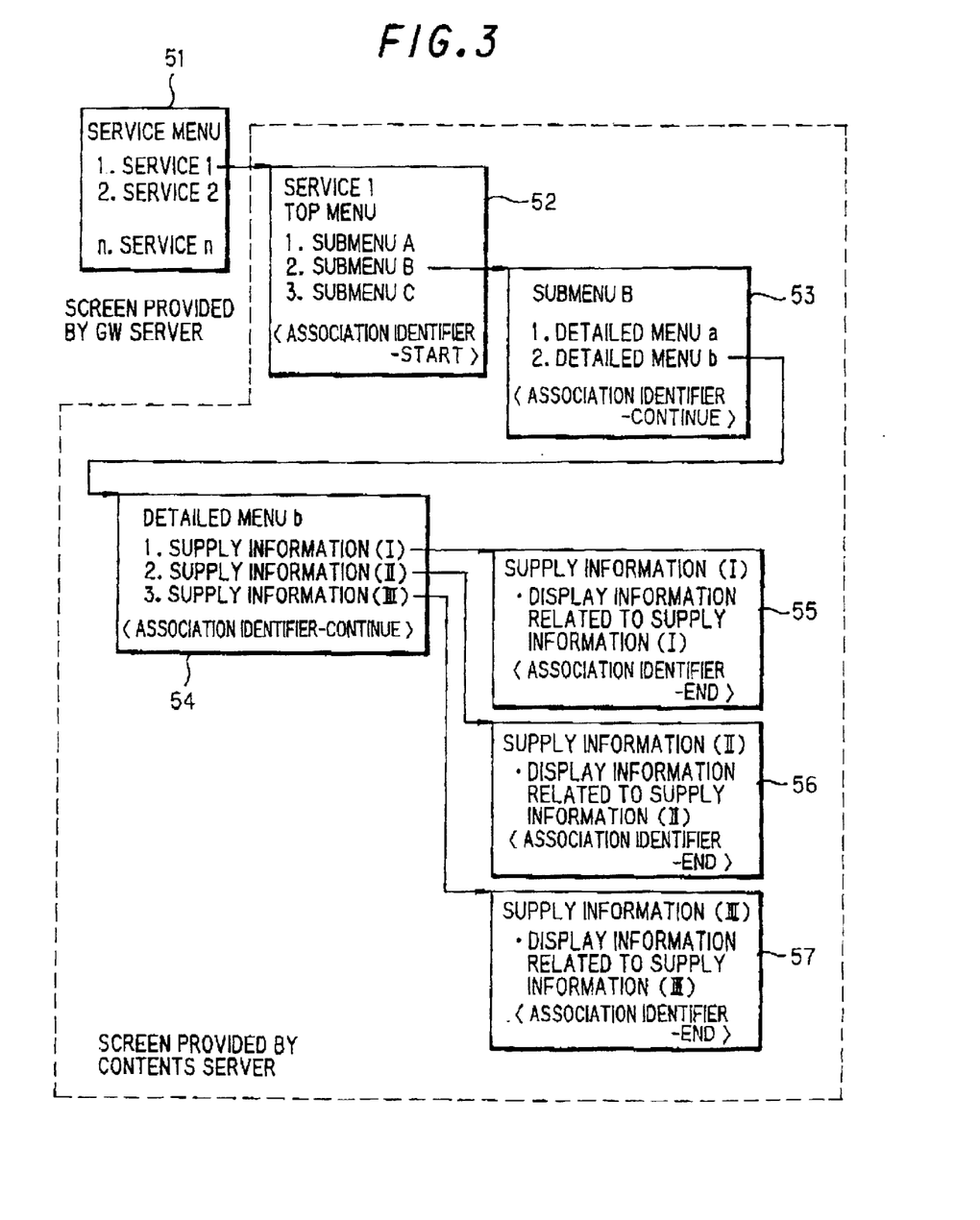
FIG. 3 is a diagram showing a preferred embodiment of the invention.

According to the invention, as shown in FIG. 3, association identifiers representing a series of service elements (start, continue, and end) are imparted respectively to screen informations having a tree structure constituting a web service supplied by the contents server (12). The association identifiers are contained respectively in screen informations sent from the contents server (12) to the GW server (13). The GW server (13) uses the association identifiers for judging the screen informations as a series of service elements.

To this end, the GW server (13) according to the invention has the function of judging, as a series of service elements, the association identifiers contained in the screen informations and, in addition, has the function of deleting the association identifier from the received screen information to reconfigure screen information to be sent to the mobile user terminal (11).

Figure 4:
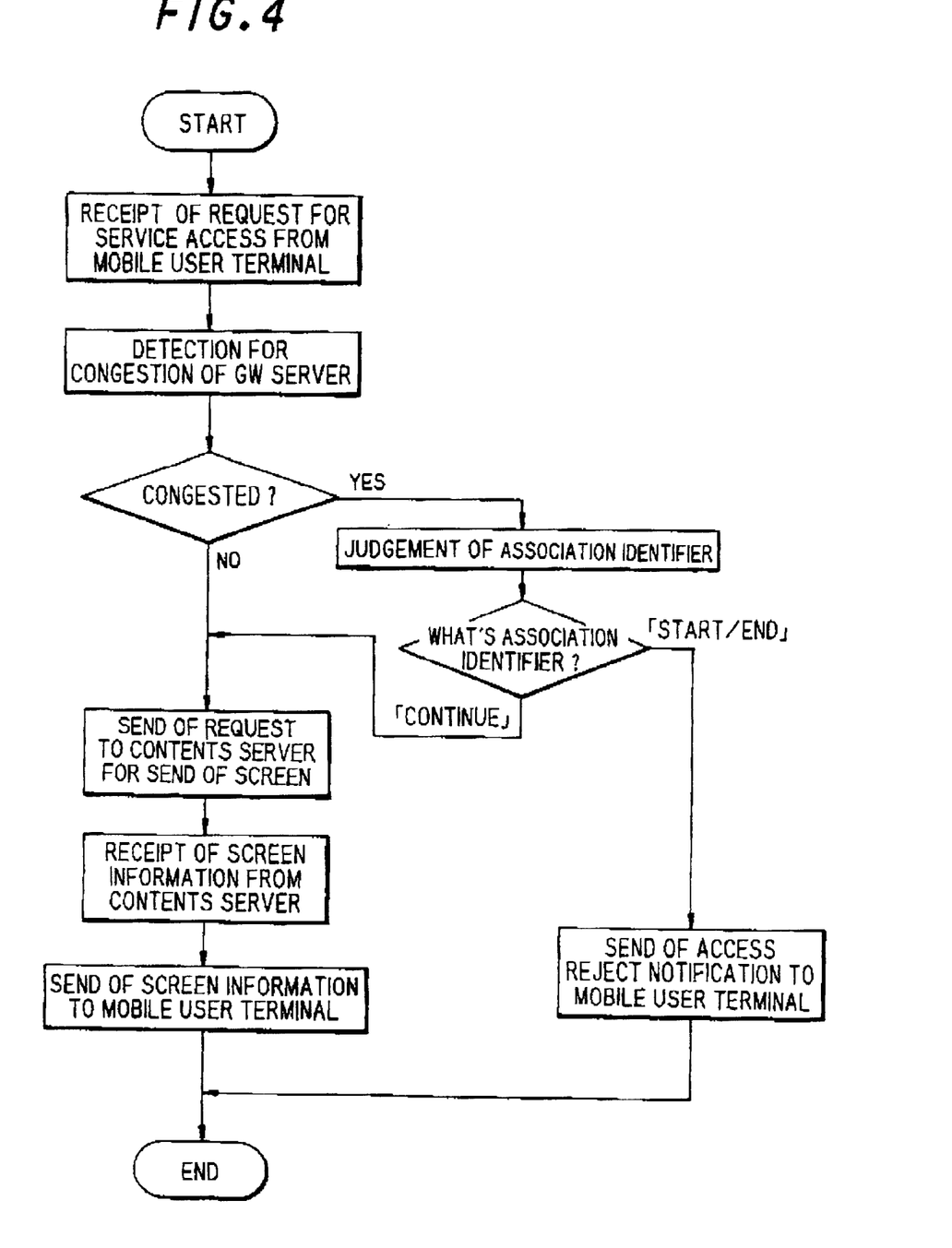
FIG. 4 is a flow chart showing the operation of the GW server according to the invention.

FIG. 4 is a flow chart showing the operation of the GW server (13) according to the invention. The operation of the invention will be explained in conjunction with FIGS. 1 to 4.

When a web service is provided, the service is constructed as a group of screens having a tree structure in a menu form shown in FIG. 2. A service menu (31) is a screen for selecting a desired service from a service 1 (32), a service 2 (33), and a service n (34). The service 1 (32) comprises a group of screens having a tree structure for advanced search of target service information in a menu manner.

Service information contemplated by users is merely individual supply information, and the construction of the menu provided for arrival at the contemplated service information is merely means for obtaining information. For this reason, association identifiers are provided for recognizing, as a single service element, the flow of a series of services required for reaching the target information, that is, service 1 (32)→submenu B (53)→detailed menu b (54)→supply information I (55).

Specifically, this can be realized by imparting association identifiers as shown in FIG. 3 to screen informations constituting respective services provided by the contents server (12). The association identifiers are constituted respectively by an identifier "start" representing a start screen of a series of service elements, an identifier continue representing a screen located along the way to target information, and an identifier "end" representing a screen of the final target information.

Thus, service elements are associated with one another and are regarded as a series of services, that is, top menu (52) <association identifier—start> in service 1→submenu B (53) <association identifier—continue>→detailed menu b (54) <association identifier—continue>→supply information I (55) <association identifier—end>.

In FIG. 1, upon access from the mobile user terminal (11) to the web service, services are provided through the GW server (13). Thereafter, the selection of a service from the mobile user terminal (11) permits menu information for services to be supplied from the contents server (12), for providing individual services, to the mobile user terminal (11).

When congestion has taken place in the GW server (13) during this operation, the GW server (13) judges the association identifier contained in the screen information sent from the contents server (12). When a series of services bound for the target information are in progress and, at the same time, the association identifier attached to the screen information represents "continue," the relay of the transfer of service information is continued until an association identifier representing "end" appears. For a request for the connection of a new service provided with an association identifier representing "start," the GW server (13) informs the user terminal of that the service is unaccessible due to congestion, followed by the cut-off of the connection and the stop of the processing of a request for a new service until the congested state is released.

Specifically, when the association identifier for the requested service is "continue," the GW server judges that this service is one which is in connection and to which priority in connection under congestion is to be given, followed by a request to the contents server for the provision of the service. The association identifiers are used for indicating the association of a series of services in the GW server (13), and are not contained in the screen information transferred from the GW server (13) to the mobile user terminal (11).

In the above preferred embodiment, an association identifier "start" is imparted to the top menu in service 1, and an association identifier "continue" is imparted to the submenu and service elements after that. Alternatively, a method may be used wherein, for example, the association identifier "start" is imparted to the top menu in service 1 and the submenu while the identifier "continue" is imparted to the detailed menu and service elements after that. This method can reduce the number of services of which the connection is continued under congestion. This contributes to further shorten the wait time for the services.

Figure 5:
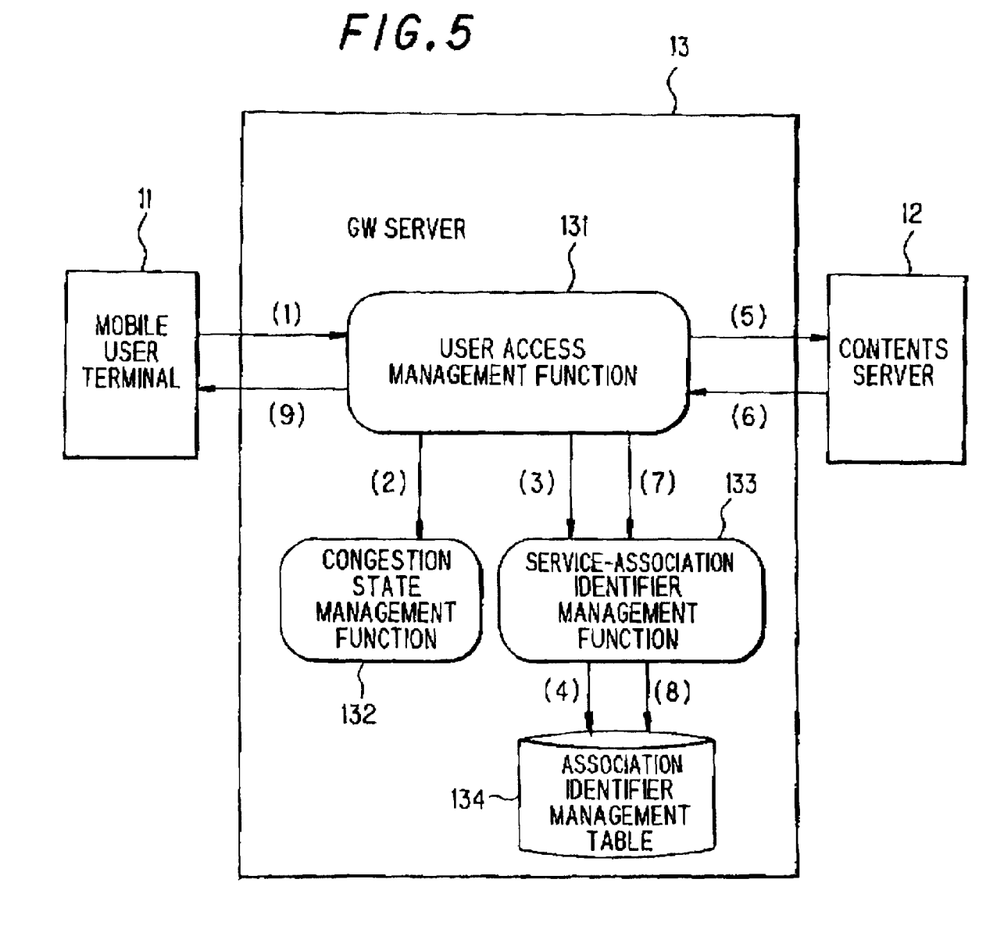
FIG. 5 is a functional block diagram showing one preferred embodiment of the GW server according to the invention.

FIG. 5 is a block diagram showing another preferred embodiment of the invention in which the function of managing the service-related identifiers has been additionally provided in the GW server (13). In FIG. 5, upon the receipt of a request for access from the mobile user terminal (11), a user access management function (131) inquires of a congestion state management function (132) about whether or not GW is in the state of congestion and, when GW has been found to be congested, refers to an association identifier management table (134) through a service association identifier management function (133) to judge whether or not the request from the mobile user terminal for access is one associated with the service being continued, and, based on the results of judgment, decides whether the request for access is to be accepted or is to be rejected.

Figure 6:
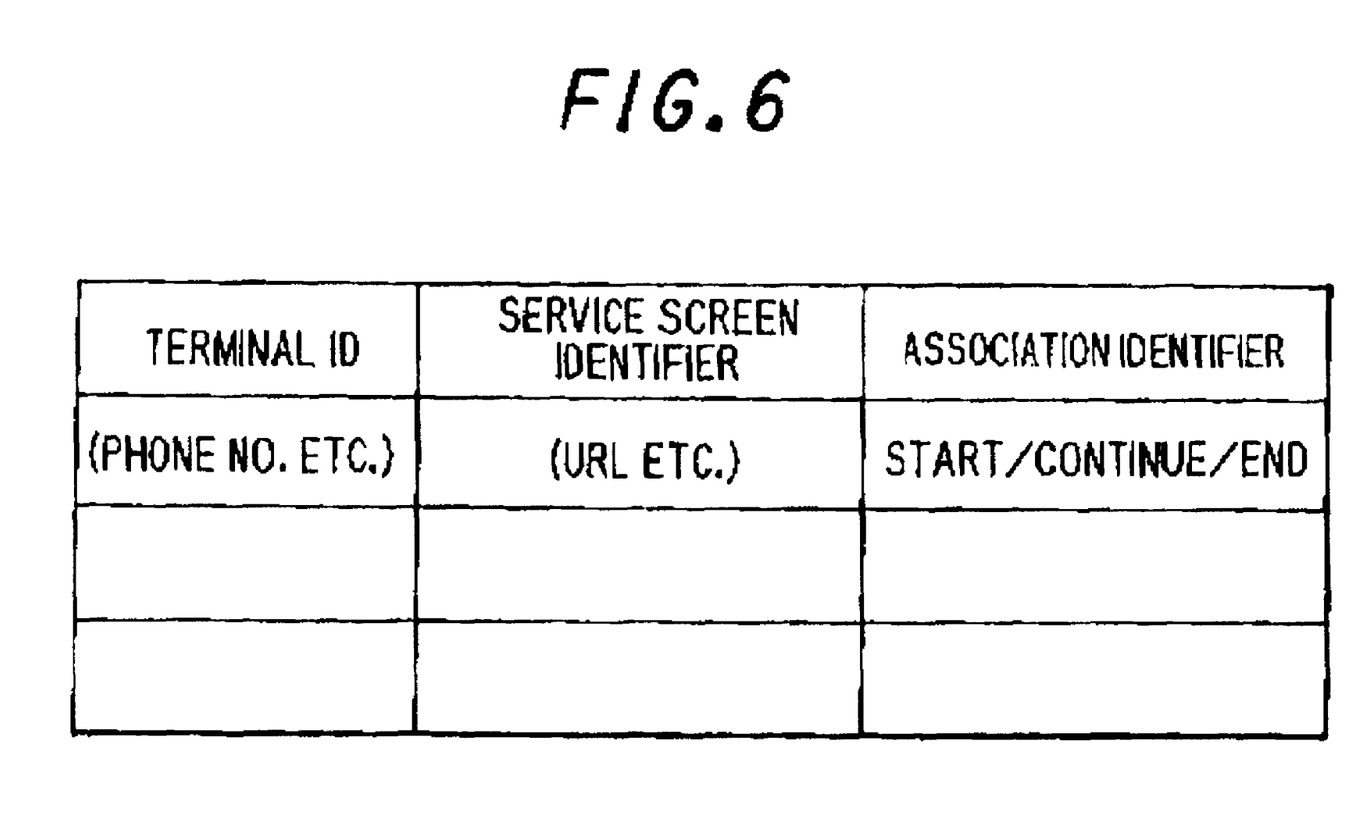
FIG. 6 is a diagram showing a preferred embodiment of the construction of an association identifier management table shown in FIG. 5.

FIG. 6 is a diagram showing a preferred embodiment of the construction of the association identifier management table (134). The association identifier management table (134) comprises a terminal ID, a service screen identifier, and an association identifier. Upon a request for access, ID of the terminal, which has requested the service, the service screen identifier of the accessed contents server, and the association identifier are cataloged.

Figure 7:
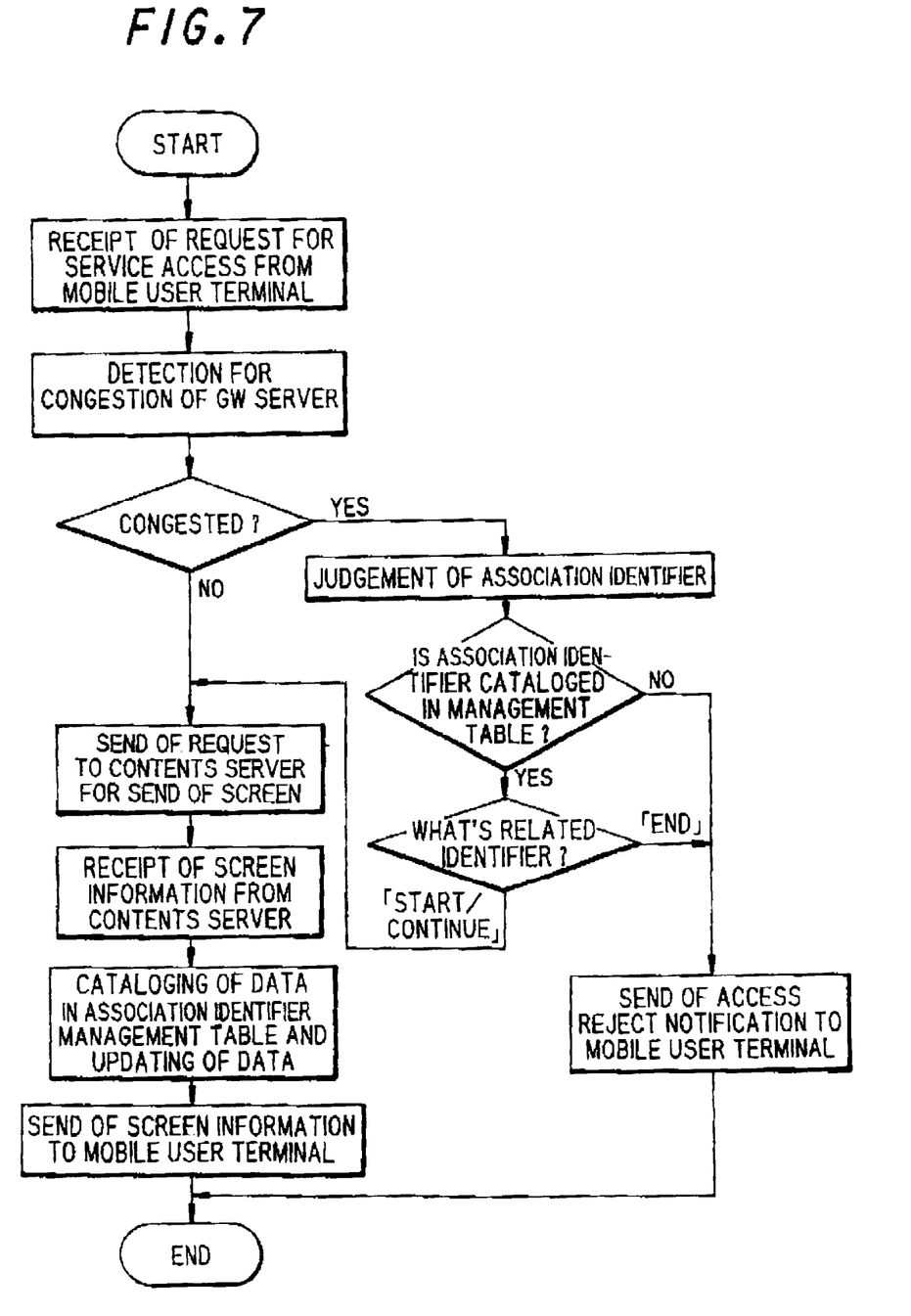
FIG. 7 is a flow chart showing a preferred embodiment of the operation of the GW server shown in FIG. 5.

FIG. 7 is a flow chart showing the operation of this preferred embodiment. The operation of this preferred embodiment will be explained.

Upon the occurrence of a request (1) from the mobile user terminal (11) for access, the user access management function (131) inquires of a congestion state management function (132) about whether or not GW is in the state of congestion. The congestion state management function (132) always monitors the congestion state of the GW system, and answers the inquiry and informs the user access management function (131) of whether or not GW is in the state of congestion. When GW is not in the state of congestion, a service menu (51) is provided in the GW server (13). In addition, the user terminal ID and the service screen identifier are cataloged in the association identifier management table (134).

Thereafter, upon the selection of a service through the mobile user terminal (11), menu information on services is supplied, from the contents server (12) for supplying individual services, to the mobile user terminal (11), and, in addition, the association identifier in the association identifier management table (134) is updated.

As soon as the congestion state management function (132) detects congestion during this operation, the user access management function (131) judges, through the service association identifier management function (133), whether or not the request from the mobile user terminal for access is related to the service being continued. That is, the service association identifier management function (133) inquires of the association identifier management table (134) using the terminal ID as a key.

When the required terminal ID is not cataloged in the association identifier management table (134), the user access management function (131) regards the request as a new request and gives the user terminal (11) a notice that GW is in the state of congestion and the access cannot be accepted. Also when the required terminal ID exists in the association identifier management table (134) and, in addition, the association identifier attached to the required service is "end," the user access management function (131) regards the request as a new request and gives the user terminal a notice that GW is in the state of congestion and the access cannot be accepted.

On the other hand, when the required terminal ID exists in the association identifier management table and, in addition, the association identifier attached to the required service is "start" or "continue," the user access management function (131) judges that the request for access is related to a service which is being continued and to which priority in connection under congestion is to be given, followed by a request to the contents server for the provision of the service. The association identifiers are used for indicating the association of a series of services in the GW server (13), and are not contained in the screen information transferred from the GW server (13) to the mobile user terminal (11).

Figure 8:
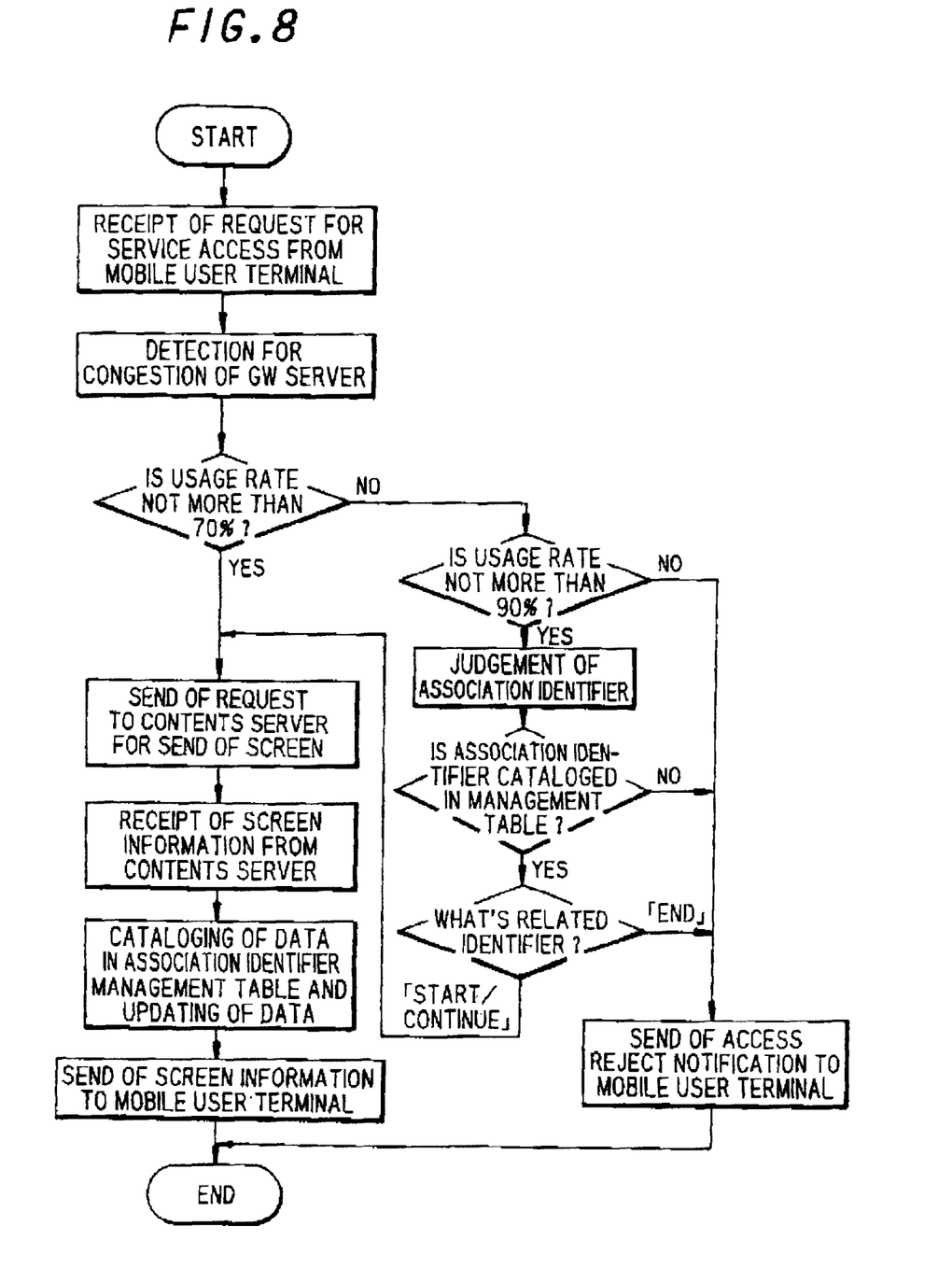
FIG. 8 is a flow chart showing another preferred embodiment of the operation of the GW server shown in FIG. 5.

FIG. 8 is a flow chart showing another preferred embodiment of the congestion control in the GW server (13) according to the invention. According to this preferred embodiment, the congestion state is divided into a plurality of stages based on the usage of the GW system, and different congestion controls are carried out according to the stage.

Specifically, upon the occurrence of a request (1) from the mobile user terminal (11) for access, the user access management function (131) inquires of a congestion state management function (132) about whether or not GW is in the state of congestion. The congestion state management function (132) always monitors the congestion state of the GW system, and answers the inquiry and informs the user access management function (131) of whether or not GW is in the state of congestion.

The congestion state in the congestion state management function (132) is judged, for example, based on the usage of CPU in the GW system. For example, a CPU usage of 70% is defined as a first threshold, and a CPU usage of 90% as a second threshold. The user access management function (131) accepts all requests from the mobile user terminal for access until the usage of CPU reaches a first threshold; when the usage falls within the range of the first threshold to the second threshold, the user access management function (131) accepts only a request for access wherein the association identifier is "start/continue" while a request for access, wherein the association identifier is "end", is rejected; and, when the usage exceeds the second threshold, the user access management function (131) rejects all requests.

Thus, according to the invention, even when the GW server (13) has become a congestion state, the supply of the service to the user is continued when a series of services bound for the target information is in progress. Therefore, the cut-off of the connection during the utilization can be prevented. Further, since a request for the start of utilization is rejected, the wait time during the utilization of the service can be shortened. This can contribute to improved convenience when the user utilizes the service.

In the above preferred embodiment, a congestion control system, wherein priority is given to a service being continued, has been applied to the GW server (13). The congestion control system, wherein a series of screens constituting the service of the invention are recognized as a single service and priority is given to the service being continued, can also be applied to the contents server (12) shown in FIG. 1, and, in addition, can be simultaneously applied to the GW server (13) and the contents server (12).

Specifically, when a plurality of GW servers (13), which perform a request to the contents server (12) for access, are provided, the GW servers (13) would not be brought to a congestion state. In this case, however, it is expected that access to the contents server (12) becomes intensive and, thus, the contents server (12) is brought to a congestion state, when the contents server (12) is congested, upon the receipt of a request for a new service, the contents server (12) rejects the request for access from a menu having an association identifier "start," and response processing is continued only when a request for service provided with an association identifier "continue" has taken place.

Further, this congestion control system can also be applied to a telephony service server which, when the realization of a telephony service supplied via a GW server (13) is contemplated, is connected to the GW server. The telephony service server is connected between the Internet (22) and a public telecommunication network to provide a service of telephone number search and a connection service to users. Upon the occurrence of congestion, response processing in the same manner as described above in connection with the contents server (12) can shorten the wait time for the service in which the selection of menus is already continued.

According to the invention, even when the GW server is in the state of congestion, the supply of a service being in connection is continued. Therefore, the cut-off of the connection during the utilization of the service can be prevented, and, in addition, the wait time for the service can be shortened. This can contribute to improve convenience when the user utilizes the service.

The invention has been described in detail with particular reference to preferred embodiments, but it will be understood that variations and modifications can be effected within the scope of the invention as set forth in the appended claims.

What is claimed is:

1. A congestion control method for a network comprising:
a mobile user terminal located in a mobile network; a contents server for providing a contents service in the Internet; and a GW (gateway) server used as a repeater in the case where access is made from the mobile network to the Internet, wherein association identifiers for identifying, as the flow of a series of services, screen informations ranging from information in a service top menu to supply information in contemplated service are imparted to respective screen informations in a tree structure constituting a web service provided by the contents server, and upon the occurrence of congestion, priority connection control of the service being in connection is performed based on the association identifiers, the association identifiers are constituted respectively by identifiers representing "start," "continue," and "end,"

upon the occurrence of congest ion in the GW server, the GW server judges the association identifier contained in the screen information to be relayed, and for a request for the connection of a service provided with an association identifier representing "continue," the relay of the transfer of service information is continued until an association identifier representing "end" appears, while for a request for the connection of a service provided with an association identifier representing "start," the connection is cut off.

2. A congestion control method for a network comprising:
a mobile user terminal located in a mobile network;
a contents server for providing a contents service in the Internet; and
a GW (gateway) server used as a repeater in the case where access is made from the mobile network to the Internet, wherein association identifiers for identifying, as the flow of a series of services, screen informations ranging from information in a service top menu to supply information in contemplated service are imparted to respective screen informations in a tree structure constituting a web service provided by the contents server, and upon the occurrence of congestion, priority connection control of the service being in connection is performed based on the association identifiers, the association identifiers are constituted respectively by identifiers representing "start," "continue," and "end,"

upon the occurrence of congestion in the contents server, the contents server judges the association identifier contained in the screen information to be supplied, and for a request for the connection of a service provided with an association identifier representing "continue," the relay of the transfer of service information is continued until an association identifier representing "end" appears, while for a request for the connection of a service provided with an association identifier representing "start," the connection is cut off.

3. The congestion control method according to claim 1, wherein the Internet is connected to a public telecommunication network through a telephony service server, association identifiers for identifying, as the flow of a series of services, screen informations ranging from information in a service top menu to supply information in contemplated service are imparted to respective screen informations in a tree structure constituting a web service provided by the telephony service server, and upon the occurrence of congestion, priority connection control of the service on connection is performed based on the association identifiers.

4. The congestion control method according to claim 3, wherein the association identifiers are constituted respectively by identifiers representing "start," "continue," and "end,"

upon the occurrence of congestion in the telephony service server, the telephony service server judges the association identifier contained in the screen information to be supplied, and for a request for the connection of a service provided with an association identifier representing "continue," the transfer of service information is continued until an association identifier representing "end" appears, while for a request for the connection of a service provided with an association identifier representing "start," the connection is cut off.

5. A congestion control system for a network comprising:
a mobile user terminal located in a mobile network; a contents server for providing a contents service in the Internet; and a GW (gateway) server used as a relay device in access from the mobile network to the Internet, wherein association identifiers for performing the priority connection control of a service being in connection upon the occurrence of congestion are imparted respectively to screens of a tree structure constituting a web service provided by the contents server, the GW server has the function of judging the association identifiers, contained in the screen information, as a series of service elements and the function of performing the priority connection control of a service being in connection upon the occurrence of congestion in the GW server, wherein, the association identifiers are constituted respectively by identifiers representing "start," "continue," and "end," and upon the occurrence of congestion, for a request for the connection of a service provided with an association identifier representing "continue," the means for performing the priority connection control of a service being in connection continues the transfer of service information until an association identifier representing "end" appears, while for a request for the connection of a service provided with an association identifier representing "start," the means for performing the priority connection control of a service on connection cuts off the connection.

6. A congestion control system for a network comprising:
a mobile user terminal located in a mobile network; a contents server for providing a contents service in the Internet; and a GW (gateway) server used as a relay device in access from the mobile network to the Internet, wherein association identifiers for performing the priority connection control of a service being in connection upon the occurrence of congestion are imparted respectively to screens of a tree structure constituting a web service provided by the contents server, the contents server has the function of judging the association identifiers, contained in the screen information, as a series of service elements and the function of performing the priority connection control of a service being in connection upon the occurrence of congestion in the contents server, wherein, the association identifiers are constituted respectively by identifiers representing "start," "continue," and "end," and upon the occurrence of congestion, for a request for the connection of a service provided with an association identifier representing "continue," the means for performing the priority connection control of a service being in connection continues the transfer of service information until an association identifier representing "end" appears, while for a request for the connection of a service provided with an association identifier representing "start," the means for performing the priority connection control of a service on connection cuts off the connection.

7. The congestion control system according to claim 5, wherein a telephony service server for connecting the Internet to a public telecommunication network is provided, association identifiers for performing the priority connection control of a service being in connection upon the occurrence of congestion are imparted respectively to screens of a tree structure constituting a web service provided by the telephony service server, and the telephony service server comprises: means for judging the association identifiers, contained in the screen information, as a series of service elements; and means for performing the priority connection control of a service being in connection upon the occurrence of congestion in the telephony service server.

8. A congestion control system for a network comprising: a mobile user terminal located in a mobile network; a contents server for providing a contents service in the Internet; and a GW (gateway) server used as a relay device in access from the mobile network to the Internet, wherein association identifiers for performing the priority connection control of a service being in connection upon the occurrence of congestion are imparted respectively to screens of a tree structure constituting a web service provided by the contents server, the association identifiers are constituted respectively by identifiers representing "start," "continue," and "end,"

upon the occurrence of congestion, for a request for the connection of a service provided with an association identifier representing "continue," the means for performing the priority connection control of a service being in connection continues the transfer of service information until an association identifier representing "end" appears, while for a request for the connection of a service provided with an association identifier representing "start," the means for performing the priority connection control of a service on connection cuts off the connection.

9. A congestion control system for a network comprising: a mobile user terminal located in a mobile network; a contents server for providing a contents service in the Internet; and a GW (gateway) server used as a relay device in access from the mobile network to the Internet, wherein association identifiers for performing the priority connection control of a service being in connection upon the occurrence of congestion are imparted respectively to screens of a tree structure constituting a web service provided by the contents server, the GW server has a user access management function, a congestion state management function, a service association identifier management function, and an association identifier management function, and upon the receipt of a request from the mobile user terminal for access, the user access management function inquires of the congestion state management function about whether or not GW is in the state of congestion and, when GW has been found to be congested, refers to the association identifier management table through the service association identifier management function to judge whether or not the request from the mobile user terminal for access is related to the service being continued, and, based on the results of judgment, decides whether the request for access is to be accepted or is to be rejected.

10. The congestion control system according to claim 9, wherein the association identifier management table comprises a terminal ID, a service screen identifier, and an association identifier, and upon a request from the mobile user terminal for access, the GW server catalogs ID of the mobile user terminal, the identifier for the service screen of the accessed contents server, and the association identifier through the service association identifier management function into the association identifier management table and updates the data of the association identifier management table.

11. The congestion control system according to claim 10, wherein, upon the receipt of a notice of the detection of the congested state from the congested state management function, the user access management function refers to the association identifier management table through the service association identifier management function, and, when the mobile user terminal ID inquired of the association identifier management table is not cataloged, or when the mobile user terminal ID inquired of the association identifier management table is present and, at the same time, the association identifier on the requested service is "end," informs the user terminal that the requested service is unaccessible due to congestion, while, when the mobile user terminal ID inquired of the association identifier management table is present and, at the same time, the association identifier on the requested service is "start" or "continue," the user access management function judges that the requested service is related to the service being continued which has priority in connection under congestion, followed by a request to the contents server for the provision of service.

12. The congestion control system according to claim 9, wherein the congested state management function judges the congested state based on the usage of CPU in GW system.

13. The congestion control system according to claim 12, wherein the user access management function accepts all requests from the mobile user terminal for access until the usage of CPU reaches a first threshold; when the usage falls within the range of the first threshold to a second threshold, the user access management function accepts only a request for access wherein the association identifier is one of "start" and "continue", and, when the usage exceeds the second threshold, the user access management function rejects all requests.

14. The congestion control method according to claim 2, wherein the Internet is connected to a public telecommunication network through a telephony service server, association identifiers for identifying, as the flow of a series of services, screen informations ranging from information in a service top menu to supply information in contemplated service are imparted to respective screen informations in a tree structure constituting a web service provided by the telephony service server, and upon the occurrence of congestion, priority connection control of the service on connection is performed based on the association identifiers.

15. The congestion control system according to claim 6, wherein a telephony-service server for connecting the Internet to a public telecommunication network is provided, association identifiers for performing the priority connection control of a service being in connection upon the occurrence of congestion are imparted respectively to screens of a tree structure constituting a web service provided by the telephony service server, and the telephony service server comprises: means for judging the association identifiers, contained in the screen information, as a series of service elements; and means for performing the priority connection control of a service being in connection upon the occurrence of congestion in the telephony service server.

* * * * *